United States Patent [19]

Scheurenbrand

[11] Patent Number: 4,497,206
[45] Date of Patent: Feb. 5, 1985

[54] GRAVIMETER

[75] Inventor: Hans Scheurenbrand, Stetten, Fed. Rep. of Germany

[73] Assignee: Bodenseewerk Geratetchnik GmbH, Uberlingen, Fed. Rep. of Germany

[21] Appl. No.: 474,765

[22] Filed: Mar. 14, 1983

[30] Foreign Application Priority Data

Mar. 17, 1982 [DE] Fed. Rep. of Germany ....... 3209590

[51] Int. Cl.³ .............................................. G01V 7/00
[52] U.S. Cl. ................................................. 73/382 R
[58] Field of Search ..................................... 73/382 R

[56] References Cited

U.S. PATENT DOCUMENTS 2,331,904 10/1943 Gustafsson ...................... 73/382 R
3,464,255 9/1969 Davidson et al. ............. 73/517 AV
3,717,036 2/1973 La Coste ......................... 73/382 R
3,897,686 8/1975 Willmore ........................ 73/382 R

*Primary Examiner*—James J. Gill

*Attorney, Agent, or Firm*—Howard H. Darbo

[57] ABSTRACT

In a gravimeter the measuring mass is supported by springs which are arranged in regular array around the measuring mass and exert pressing forces on the measuring mass along lines of action extending at an angle to the horizontal. The state of equilibrium with a predetermined value of the acceleration due to gravity coincides with an extreme value of the force-versus-deviation characteristic of the spring system, whereby the measuring mass is held practically free from restoring forces by the spring system. A sensor detects deviations from a zero position and controls a restoring force generator. Two counter-acting sets of springs are provided. The springs are tension springs, the tensional force of which acts on the measuring mass as a pressing force through a lever transmission. A measuring range spring permits setting of measuring ranges. An advantageous construction therefor is described. Furthermore a device for optionally placing an additional mass on the measuring mass is provided for calibration purposes.

20 Claims, 7 Drawing Figures

GRAVIMETER

The invention relates to a gravimeter comprising
(a) a measuring mass held in a housing for rectilinear, vertical movement,
(b) prestressed spring means for weakly supporting said measuring mass in a state of equilibrium,
(c) a sensor arranged to respond to deviations of said measuring mass from said state of equilibrium,
(d) restoring force generator means controlled by said sensor and operatively connected to said measuring mass for exerting a restoring force on said measuring mass, in accordance with a restoring force-versus-deviation characteristic, when said measuring mass deviates from said state of equilibrium.

A gravimeter is an instrument which permits measurement of variations of the acceleration due to gravity in different points of the surface of the earth. The variations of the acceleration due to gravity within an area of the surface of the earth under examination or through the depth of a borehole permits conclusions with respect to geologic structures, in particular to the presence and the position of deposits. With such measurements it is necessary to measure extremely small variations of the acceleration due to gravity with high accuracy, for example in the order of magnitude of $\mu$ gal. To this end prior art gravimeters compise a vertically movable, spring—suspended mass, the spring force balancing the weight of the mass at a certain value of the acceleration due to gravity. When the acceleration due to gravity deviates from this value, the mass will be deflected. It is known to pick-off this deviation by means of an inductive, capacitive or photoelectric sensor and to compensate for the weight variation by a restoring force generator. Furthermore it is known to provide a measuring range spring acting on the measuring mass, the tension of this spring being adjustable for varying the measuring range of the gravitational deviation.

German Pat. No. 1,165,290 discloses a gravimeter wherein the measuring mass is a two armed lever. The lever is pivotable in a vertical plane about a horizontal axis by means of a tension wire suspension. A pair of torsion springs exerts a torque on the lever, whereby the lever is exactly horizontal with a predetermined value of the acceleration due to gravity. The lever consists of a thin aluminum sheet metal piece and is movable in the air gap of a permanent magnet, whereby motions of the lever are damped by eddy current damping. A measuring range spring acts on the lever. The tension of this measuring range spring is variable by a spindle mechanism. A photoelectric pick-off provides a signal, when the lever is deflected from its horizontal position. This signal controls a servomotor which, through a spindle mechanism, adjusts a tension spring also acting on the lever to return the lever always into its zero position. The adjusting movements are recorded and provide a measure of the acceleration due to gravity.

In a gravimeter of similar construction (German Pat. No. 1,230,577), the lever is connected with an iron rod, which forms the core of a differential transformer. The signal generated across this differential transformer, when the lever is deflected, controls the current in a correction coil, which is secured to the lever between the poles of a permanent magnet. The magnetic force exerted on the coil by the permanent magnets always returns the lever to its zero position.

U.S. Pat. No. 2,977,799 discloses a gravimeter in which a measuring mass is provided on a lever pivotable about a horizontal axis. A tension spring acts on the lever. The tension spring is arranged at such an angle between the lever and a housing that, on one hand, the weight of the measuring mass is balanced and, on the other hand, a very small restoring force occurs, when the measuring mass is deflected. The measuring mass is heavily overdamped. For the measurement of the acceleration due to gravity, the spring tension is varied and recorded, and the mean is formed of two passages of the measuring mass through a predetermined position.

A similar arrangement is described in the periodical "Physics" July 1934, Vol. 5 pages 178–180.

With such gravimeters the measuring mass of which are formed by a pivotably mounted lever, errors may be caused by external vibrations, which cause a deflection of the lever which does not become zero even if the mean is taken, due to a "rectifier effect".

A gravimeter is disclosed by German Pat. No. 1,623,389 or Canadian Pat. No. 830,194, wherein the measuring mass is guided for vertical movement by a tension wire suspension. The tension wire suspension comprises tension wires which are connected to the measuring mass at a distance from the vertical axis thereof and extend substantially tangentially from this measuring mass. The tension wires extend to three vertical columns angularly spaced by 120°. A torsional force exerted on the measuring mass by a torsion spring keeps the tension wires tensioned. Furthermore the measuring mass is connected through a traction wire to a lever which is pivotable about a lateral pivot axis. A torsional force is exerted on this lever by a torsion spring and balances the weight of the measuring mass with a predetermined value of the acceleration due to gravity. A further torsion spring with adjustable tension permits adjustment of the measuring range and thus serves as measuring range spring. Deviation of the measuring mass from its zero position is picked off by means of a differential transformer. The pick-off signal is applied to an electromagnetic restoring force generator.

In another gravimeter, in which the measuring mass is held for vertical movement in similar manner (German Offenlegungsschrift No. 1,908,232), the measuring mass is a hollow-cylindrical body. A tension spring extends within this hollow-cylindrical body and is connected to an adjusting screw guided in an upper housing cover. Deviations of the measuring mass from a zero position are picked off by means of a differential capacitor. The pick-off signal controls an electromagnetic restoring force generator.

U.S. Pat. No. 3,717,036 describes a force measuring device with a rectilinearily guided measuring mass. The measuring mass is mounted in a housing through links of substantially identical lengths such that the measuring mass is movable translationally along an axis and simultaneously makes a rotary motion about this axis. When this force measuring device is used as gravimeter, in which said axis is vertical, the weight of the measuring mass is balanced by two parallel tension springs extending at an angle to the axis.

In the prior art gravimeters the weight of the measuring mass is balanced by a pretensioned spring at a predetermined acceleration due to gravity. The tension of this spring varies linearly with the deviation of the measuring mass from the zero position in accordance with the spring characteristic of this spring. Therefore a very weak spring has to be used, in order to achieve sufficiently large deviations of the measuring mass with the small variations of the acceleration due to gravity. This presents design problems in view of the accuracy required. Rather long springs are required, which in most gravimeters are torsion springs acting on a pivotable lever. This results in rather bulky construction of the gravimeter.

It is an object of the invention to construct a gravimeter of the type defined in the beginning with a measuring mass mounted for rectilinear vertical movement, and a restoring force generator such, that the springs, on one hand, support the weight of the measuring mass and, on the other hand, create a small restoring force only, when the measuring mass deviates from the zero position. The springs should be arranged in such a way that a compact structure of the gravimeter, as it is, for example, required of a borehole gravimeter, is achieved.

According to the invention, this object is achieved in that (e) said spring means comprise springs which
  ($e_1$) are arranged in regular array around said measuring mass, and
    ($e_2$) are arranged to exert pressing forces on said measuring mass along respective lines of action which are inclined with respect to the horizontal,
(d) said state of equilibrium coincides with a value of minimum, substantially zero slope of said resultant restoring force-versus-deviation characteristic of said spring means.

Because of the regular array of the springs around the measuring mass the horizontal components of the spring forces will counterbalance each other. When the measuring mass deviates from its zero position, the resultant vertical component of the spring forces will be varied by two influences. Firstly the tension of the spring is varied, as the distance of the fastening points of the spring is varied. In addition, however, also the direction of the spring force is changed, and thus the effective vertical component of this spring force. It can be shown that these two influences result in a restoring force-versus-deviation characteristic of the springs which has an extreme value. The operating point of the measuring mass in placed into this extreme value. This means the vertical component of the spring forces is equal to the weight of the measuring mass at the acceleration due to gravity corresponding to the operating point. When the acceleration due to gravity deviates from this value and the measuring mass is displaced accordingly, the springs practically will not exert any restoring forces on the measuring mass. Thus the measuring mass will respond with high sensitivity to variations of the acceleration due to gravity.

If only one set of springs is provided which create an upward force equal to the weight of the measuring mass, very weak springs are required. This may present problems, in particular if transverse accelerations occur. These problems can be avoided in that said spring means comprise (a) a first set of springs arranged to exert an upward resultant force on said measuring mass and
(b) a second set of springs arranged to exert a downward resultant force on said measuring mass, said resultant restoring force-versus-deviation characteristic resulting from the difference of these two resultant forces.

In this way two rather solid spring systems can be provided, each of which would create a substantial restoring force. The desired low restoring force passing through an extreme value is achieved by the counteraction of the resultant vertical components created by the two spring systems.

Pressing forces are exerted on the measuring mass. Normally this would require compression springs. Compression springs, however, present design problems. For this reason it is advantageous that said spring means comprises (a) tension springs arranged to exert tensile forces, and
(b) lever transmission means operatively connected to said tension springs for converting said tensile forces into said pressing forces, and operatively connected to said measuring mass to exert said pressing forces on said measuring mass.

An advantageous structure of the gravimeter is obtained in that (a) said measuring mass is a generally hollow cylindrical body, which has an upper end and a lower end and is arranged central in said housing and is supported with respect to said housing by said spring means and which defines a central bore within said body,
(b) said restoring force generator means comprises coil means, which surround said measuring mass coaxially, and
(c) a measuring range spring for varying the measuring range is arranged in said central bore, measuring range spring (112) having a lower end, which is affixed to said lower end of said measuring mass, and an upper end,
(d) an adjusting member is mounted on said housing for vertical adjustment relative thereto, said upper end of said measuring range spring being secured to said adjusting member.

Furthermore there may be means permitting an additional mass to be placed on said measuring mass for calibration purposes.

Modifications of the invention are subject matter of the sub-claims 6 to 21.

Embodiments of the invention are described in greater detail hereinbelow with reference to the accompanying drawings.

Figure 1:
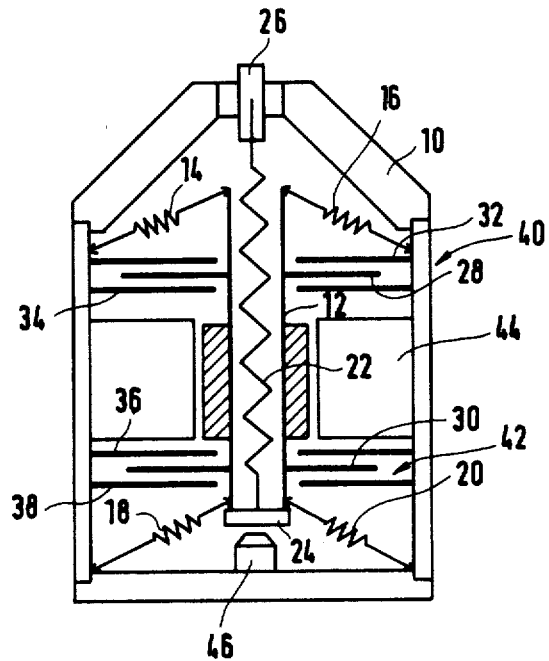
FIG. 1 illustrates schematically the basic setup of a gravimeter.

FIG. 1 is a schematic vertical sectional view of a gravimeter. A generally hollow-cylindrical measuring mass 12 is vertically movably suspended in a housing 10 through springs 14,16,18,20. In this embodiment the springs 14,16,18,20 are compression springs, which are supported on the housing 10 and extend at an angle upwards to the measuring mass 12 arranged centrally in the housing 10. A measuring range spring 22 is arranged within the hollow-cylindrical measuring mass 12 and has its lower end fastened to the closed bottom 24 of the measuring mass 12. The upper end of the measuring range spring 22 is attached to an adjustment member 26, which is vertically adjustably guided in a cover portion of the housing 10. Capacitor plates 28,30 are attached to the measuring mass 12. These capacitor plates 28,30 together with respective pairs of annular capacitor plates 32,34 and 36,38, respectively, from differential capacitors 40 and 42, respectively. The differential capacitors 40,42 form parts of a sensor which responds to deviations of the measuring mass 12 from a zero position. The pick-off signal from the sensor are applied, in known manner, to an electromagnetic restoring force generator 44, which exerts a restoring force counteracting the deviation on the measuring mass 12 and restrains the measuring mass to its zero position. The restoring force or actually the signal supplied to the restoring force generator 44 is measured. Numeral 46 designates a stop for the measuring mass 12 which mechanically limits the movement of the measuring mass.

Figure 2:
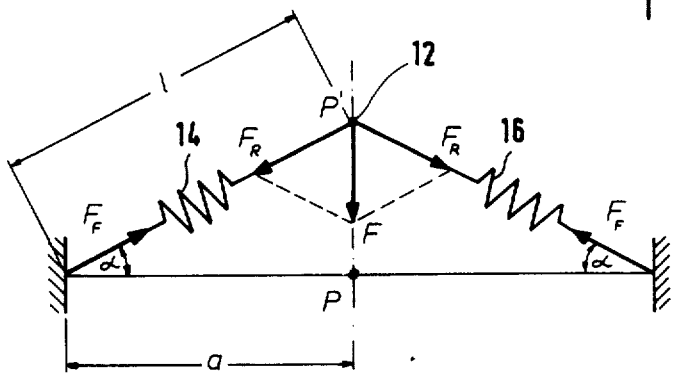
FIG. 2 illustrates the forces, when the measuring mass is supported on two compression springs.

The mode of operation of the springs is illustrated schematically in FIG. 2.

The springs 14,16 act on the measuring mass 12 at an angle $\alpha$ relative to the horizontal. The weight force F of the measuring mass 12 is resolved into components $F_R$ in the directions of the axes of the springs 14 and 16. The prestress of the springs 14 and 16 is $F_F$. The distance of the points where the springs 14 and 16 are fastened to the housing 10 and to the measuring mass 12 is designated by "l". The radius of the arrangement is designated by "a". The measuring mass 12 is assumed to be punctiform. If the measuring mass 12 moves from the position "I" illustrated to the position "II", the springs 14 and 16 will be compressed. The prestress of the springs 14 and 16 thereby increases to a value $F_o$.

The spring excursion of a spring 14 or 16 is $$f = 1 - a \tag{1}$$

wherein $$1 = \frac{a}{\cos\alpha} \tag{2}$$

This yields $$f = a\left(\frac{1}{\cos\alpha} - 1\right) \tag{3}$$

The spring constant in a spring 14 or 16 is $$c = \frac{F_o - F_F}{\Delta f} \tag{4}$$

which yields $$F_F = F_o - c \cdot \Delta f \tag{5}$$

Substituting $\Delta f$ from equation (3) results in $$F_F = F_o - a \cdot c \left(\frac{1}{\cos\alpha} - 1\right) \tag{6}$$

The resultant of the two spring forces $F_F$ is the supporting force which the springs are able to exert at an angle $\alpha$ and with given $F_o$ and c. It is $$F = 2 \cdot F_F \sin\alpha \tag{7}$$

Substituting the spring tension $F_F$ results in $$F = 2(F_o - ac)\sin\alpha - ac\ tg\ \alpha. \tag{8}$$

Figure 3:
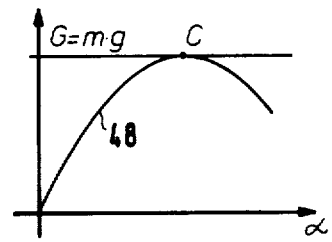
FIG. 3 illustrates the force-versus-deviation characteristic obtained thereby.

As a function of $\alpha$ or of the deviation of the measuring mass 12 the resultant force is represented by graph 48 in FIG. 3.

The operating point in which the resultant force of the springs 14,16,18,20 balances the weight of the measuring mass with a predetermined median value of the acceleration due to gravity, is placed in the maximum of the force-versus-deviation characteristic, as illustrated in FIG. 3. The parameters required therefor can be determined as follows:

The angle at which the axes of the springs 14,16,18,20 are inclined with respect to the horizontal, when the spring system exerts the maximum supporting force, is designated "astatisation angle" $\alpha_a$. This angle is computed from the first derivative of the function F given in equation (8):

$$F' = 2(F_o + ac)\cos\alpha_a - 2ac \cdot \frac{1}{\cos^2\alpha_a} = o \tag{9}$$

or $$a = \arccos\sqrt[3]{\frac{ac}{F_o + ac}}. \tag{10}$$

With this astatisation angle $\alpha_a$ the weight F of the measuring mass can be determined, with which complete astatisation is achieved, when the spring constant c and the prestress $F_o$ of the springs are given. It is $$F = 2(F_o + ac)\sin\alpha_a - 2ac\ tg\ \alpha_a. \tag{11}$$

It has been found that the measuring accuracy of the system with transverse accelerations depends largely on the astatisation angle $\alpha_a$. Therefore the astatisation angle $\alpha_a$ should be selected to give an optimum. The weight of the measuring mass is to a large extent determined by design considerations. Therefore it is advisable to given the angle $\alpha_a$ and the weight F of the measuring mass, and to determine the spring constant $c_2$ and the prestress $F_o$ of the compression springs. This results in $$c\alpha_a = \frac{F}{2a \cdot tg\alpha_a\left(\frac{1}{\cos\alpha_a} - 1\right)} \tag{12}$$

and $$F_{oa} = \frac{F(1 - \cos^3\alpha_a)}{2\sin\alpha_a(1 - \cos^2\alpha_a)}. \tag{13}$$

The calculations hereinbefore relate to spring systems in which two compression springs are angularly spaced by 180°. Similar results are obtained with spring systems in which three compression springs are angularly spaced by 120° and arranged around the measuring mass. The force-versus-deviation characteristic of such a spring system and the dimensioning rules for the spring constant and the spring prestresses can be calculated from the geometric relations of a triangular pyramid in similar way as this has been done hereinbefore with reference to two springs. This is within the skill of the average expert and therefore is not treated in detail. Essential is, at any rate, that there is an operating point at which the measuring mass, within the range of small deviations, can be moved practically free from restoring forces, though the weight of the measuring mass 12 is supported by the springs.

Figure 4:
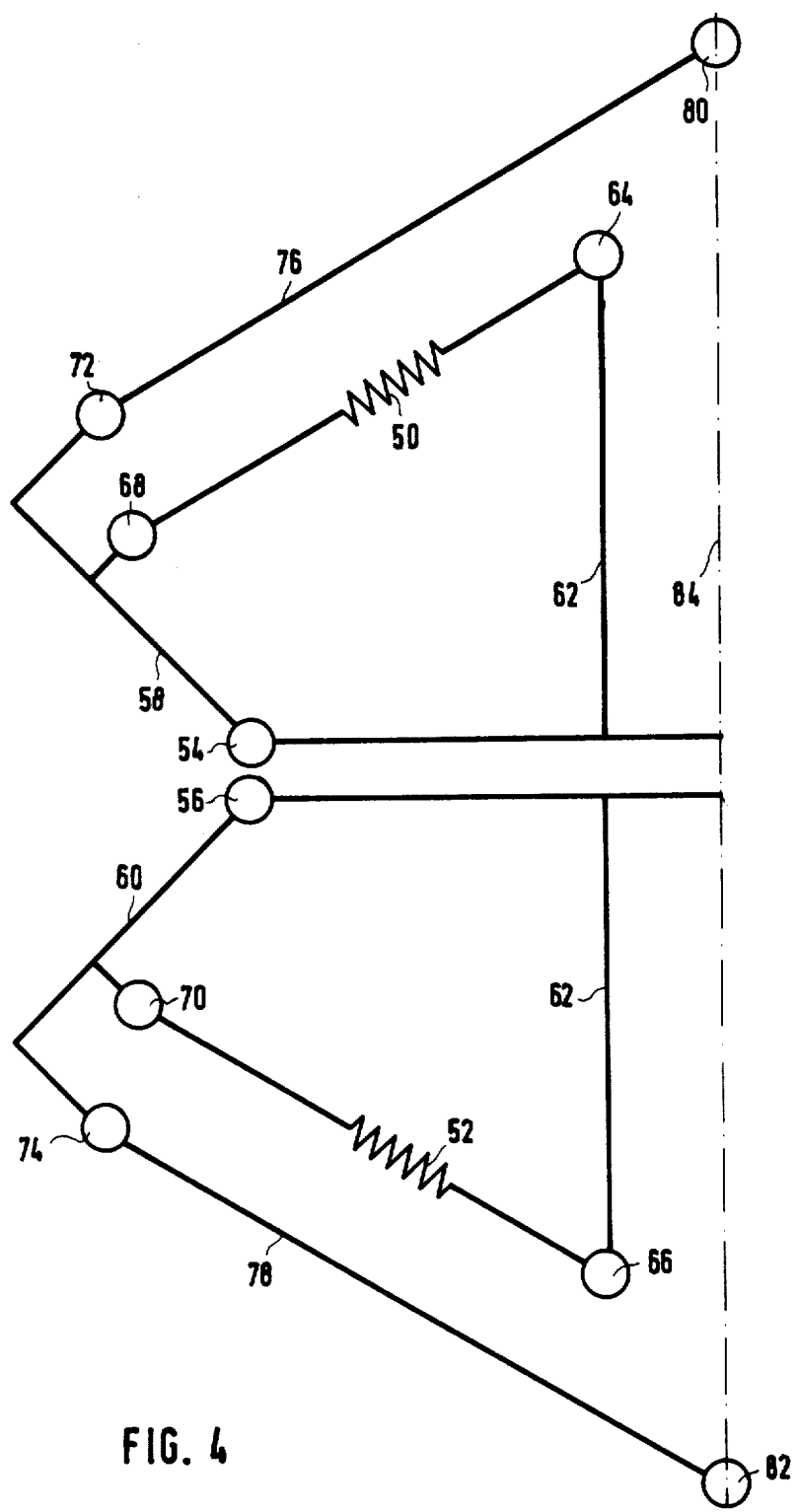
FIG. 4 illustrates the construction with two counteracting spring systems, each spring system comprising tension springs which exert pressing forces on the measuring mass through lever transmissions.

Rather weak springs would be required in an arrangement of FIG. 1. Moreover the springs 14,16,18 and 20 in FIG. 1 are compression springs. This presents design problems. These problems are avoided by an arrangement as illustrated schematically in FIG. 4. This arrangement differs from the arrangement of FIG. 1 in two respects:

There are two spring systems, one of which exerts an upwardly directed resultant force on the measuring mass, and the other one of which exerts a downwardly directed resultant force on the measuring mass. Each of these spring systems comprises three springs angularly spaced by 120°. Only one spring of each system is shown in FIG. 4. Each spring system is constructed and arranged such that the operating point coincides with the astatisation point of the respective system. The difference of the resultant spring forces created by the two spring systems balances the weight of the measuring mass at the operating point, i.e. at the predetermined acceleration due to gravity. This results in a very weak resultant restoring force which has a minimum in the operating point. Therefore, with small deviations, the measuring mass is held substantially free from restoring force.

Furthermore in the arrangement of FIG. 4 the springs 50 and 52 are tension springs. Pivotable levers 58 and 60 are pivoted on housing fixed pivots 54 and 56, respectively. The springs 50 and 52 are fastened, on one hand, to the housing 62 at points 64 and 66, respectively, and, on the other hand, to the pivotable levers 58 and 60, respectively at points 68 and 70, respectively. Links 76 and 78 are pivoted on the levers 58 and 60, respectively, at points 72 and 74, respectively. These links 76 and 78 are pivotably connected to the measuring mass at the points 80 and 82, respectively. The measuring mass is symbolized here by line 84. The links 76 and 78 extend upwards and downwards at an angle with respect to the horizontal and are substantially parallel to the axes of the springs 50 and 52, respectively. In this way the tension forces of the springs 50 and 52 are transmitted to the measuring mass 84 through the links 76 and 78, respectively, as pressing forces.

In the embodiment illustrated the points of engagement 68 and 70 of the tension springs 50 and 52 respectively, with the pivotable levers 58 and 60, respectively, are located inward of the pivot points 72 and 74, respectively, of the links 76 and 78, respectively. Instead the tension springs 50 and 52 could also act on a longer lever arm than the links 76 and 78.

The arrangement illustrated in FIG. 4 offers the advantage that relatively strong springs can be used and that these springs are tension springs.

Figure 5:
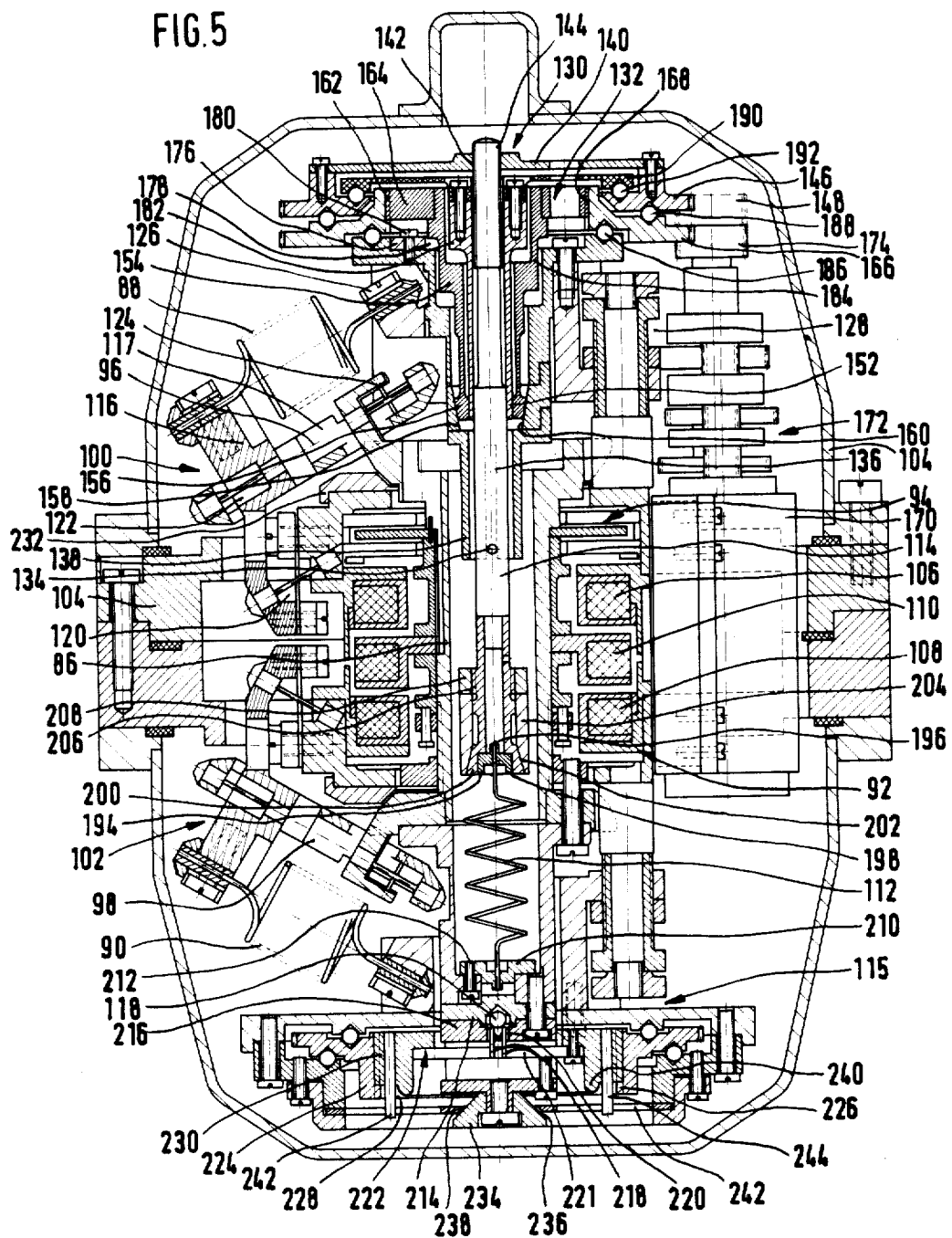
FIG. 5 shows a vertical sectional view of a borehole gravimeter.
Figure 6:
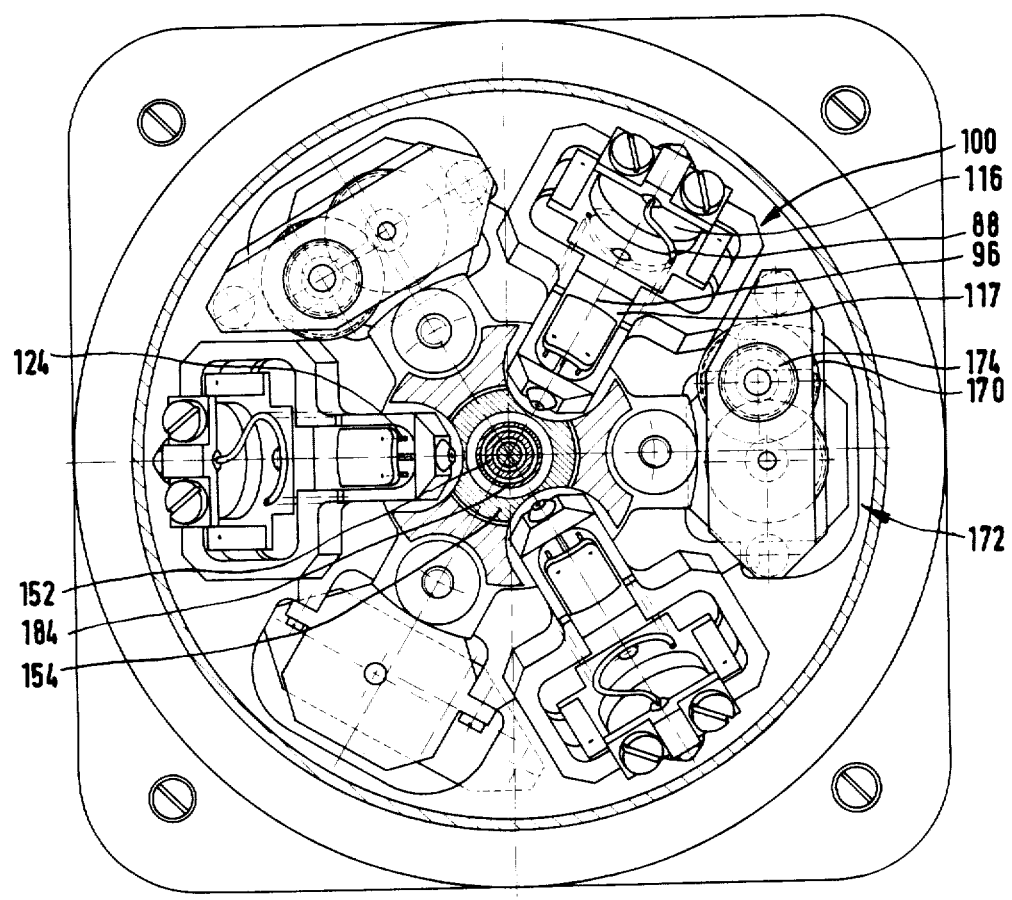
FIG. 6 shows a plan view, partly in section, of the borehole gravimeter of FIG. 5.

A preferred embodiment of a gravimeter is illustrated in FIGS. 5 and 6. This is a "borehole gravimeter". Such a borehole gravimeter must have very small dimensions only. In practice the borehole gravimeter illustrated in FIGS. 5 and 6 has a height of about 50 millimeters and a width of about 40 millimeters.

The gravimeter comprises a measuring mass 86 held for rectilinear vertical movement. In a state of equilibrium, the measuring mass 86 is supported weakly through prestressed springs 88,90. A restoring force generator 92 is arranged to exert a restoring force on the measuring mass 86, when the measuring mass deviates from the state of equilibrium. The restoring force generator 92 is controlled by a sensor 94 responding to this deviation. The springs 88,88A,88B and 90,90A,90B are arranged around the measuring mass 86 in regular arrays and exert pressing forces on the measuring mass 80 along respective lines of action 96 and 98, respectively extending at an angle to the horizontal. The state of equilibrium substantially coincides with an extreme value of the resultant force-versus-deviation characteristic of the springs 88,88A,88B and 90,90A,90B. A first set of springs 88,88A,88B exerts an upward resultant force on the measuring mass 86. A second set of springs 90,90A,90B exerts a downward resultant force on the measuring mass 86. The resultant force-versus-deviation characteristic results from the difference of these two resultant forces. As has already been explained in connection with FIG. 4, the springs 88,90 are tension springs, the tension force of which acts on the measuring mass 86 as pressing force through a lever transmission 100 and 102, respectively. The measuring mass is a generally hollow-cylindrical body, which is arranged centrally in a housing 104, and is supported on the housing 104 through the springs 88,88A,88B and 90,90A,90B. The restoring force generator 92 is a coil assembly with housing-fixed coils 106,108 and an intermediate coil 110, which is attached to the measuring mass 86 and surrounds the measuring mass coaxially. A measuring range spring 112 for changing the measuring range is arranged in the interior of the hollow-cylindrical measuring mass 86. The lower end of the measuring range spring 112 is fastened to the lower end of the measuring mass 86. The upper end of the measuring range spring 112 is fastened to a housing-fixed, adjusting member 114, which is, however, vertically adjustable relative to the housing 104.

Furthermore a device 115 is provided permitting an additional mass 118 to be optionally placed on the measuring mass 86 for calibration purposes.

The lever transmissions for the various springs 88,90 ... are identical. Therefore only the lever transmission 00 associated with spring 88 is described in detail.

The lever transmission 100 comprises a pivotable lever 116, which is pivoted on the housing 104 and on which the spring 88 exerts a tension force in the direction towards the measuring mass 86, and a link 117, which, on one hand, is pivoted on the pivotable lever 116 and, on the other hand, is pivotably connected to the measuring mass 86. The tension spring 88 extends substantially parallel to the link 117. The pivotable lever 116 is pivoted on the housing by means of a flexural pivot 120. The link 117 is pivotably connected, on one hand, to the pivotable lever 116 by means of a flexural pivot 122 and, on the other hand, is pivotably connected to the measuring mass 86 by means of a flexural pivot 124. The end of the spring 88 adjacent the housing is fastened to a spring bridge 126 of the housing 104. The spring bridge 126 is vertically adjustable. The spring bridge can be adjusted vertically by means of an adjusting mechanism 128.

Furthermore the gravimeter comprises servomotor means 130 for vertically displacing the adjusting member 114 and a clamping device 132 for clamping and firmly holding the adjusting member 114. The clamping device 132 is arranged to be actuated independently of the servomotor means 130.

The adjusting member 114 is an adjusting rod which is guided in a housing-fixed guiding sleeve longitudinally movably but non-rotatably. The adjusting rod is held against rotation by means of a longitudinal slot 136 and a transverse pin 134. The servomotor means 130 comprise an adjusting disc 140 having a central threaded bore 142 forming an adjusting thread. The adjusting rod 114 is guided in the threaded bore 142 by means of a corresponding thread 144. The servomotor means 130 also comprise a gear 146 which is connected with the adjusting disc 140 and is arranged to be driven by a servomotor through a pinion 148.

The clamping device comprises a slotted inner sleeve 152, which is arranged housing-fixed within the upper portion 154 of the guiding sleeve and which closely surrounds the adjusting rod 114. Furthermore the clamping device 132 comprises a slotted collet chuck 156, which is arranged between the guiding sleeve 138 and the inner sleeve 152. The collet chuck 156 is guided for longitudinal movement and, at its lower end, has a conical surface 158 tapering towards the lower end. A conical inner surface 160 complementary thereto is provided on the guiding sleeve 138. The clamping device 132 comprises means for displacing the collet chuck 156 axially. When the collet chuck 156 is moved downwards, it will be compressed radially through the conical inner surface 160 of the guiding sleeve and the tapering conical surface 158 of the collet chuck 156. The collet chuck 156, in turn compreses the inner sleeve 152 to clamp and firmly hold the adjusting rod 114. The means for displacing the collet chuck 156 comprise a disc 164 attached to the upper end of the collet chuck 156 and having an adjusting thread 162 on its peripheral surface, and a gear 116, which has a central, internally threaded aperture 168, into which the disc 164 is screwed with its adjusting thread 162. The gear 166 is arranged to be driven by a servomotor 170 through a transmission 172 and a pinion 174. Furthermore means are provided to hold the collet chuck 156 against rotation. This is achieved in that the inner sleeve 152 has a flange 176 which is connected to a flange 178 of the guiding sleeve 138 by screws 180, the flange 176 of the inner sleeve 152 has apertures 182 in the area between inner sleeve 152 and guiding sleeve 138, the collet chuck 156 is connected with the disc 164 attached to the upper end thereof through axial webs 184, and the webs 184 are guided in the apertures 182 of the flange 176 axially movably but non-rotatably. The gear 166 of the clamping device 132 is mounted on the housing-fixed flange 178 of the guiding sleeve 138 through a first four-point ball bearing 186. The gear 146 of the servomotor means 130 is mounted on the gear 166 of the clamping device through a second four-point ball bearing 188. A bearing prestressing disc 190 resiliently presses through a third four-point ball bearing 192 on the gear of the servomotor means 130 and thereby prestresses all four-point ball bearings 186,188 and 190.

In order to fasten the measuring range spring 112, an inversely pot-shaped spring holding member 194 is provided, which has a central pin 196 on the upper surface of its bottom. A central bore 198 passes through the bottom and the pin 196. The upper end of the measuring range spring 112 extends into this bore 198 and is secured to the pin 196. In this way the wire of the spring is guided over as short a distance as possible, in order to make any motion affected by friction between spring wire and spring holding member 194 as small as possible.

The spring holding member 194 with the end of the measuring range spring welded thereto is retained in a slotted collet chuck 200 attached to the lower end of the adjusting rod 114. The collet chuck 200 has, on its outer ourface, a conical surface 202 flaring towards the lower end. A collet sleeve 204 with a correspondingly flared conical inner surface at its lower end is guided on the collet chuck 200. A nut 208 is screwed on an external thread 206 of the collet chuck and ' presses on the upper end face of the collet chuck. Thereby the collet chuck 200 is compressed radially at its lower end and clamps and firmly holds the pot-shaped spring holding member. In similar manner a spring holding member 210 is attached to the lower end of the measuring range spring 112. This spring holding member 210 is fastened to the lower end of the hollow-cylindrical measuring mass 86 by screws 212.

The device 115 for optionally placing an additional mass 118 on the measuring mass 86 comprises a calibration ball representing the additional mass 118, which is arranged axially movable between upper and lower ball retainers 214 and 216, respectively, attached to the measuring mass. Ball supporting pins 218, preferably three such ball supporting pins which are angularly spaced by 120°, extend through apertures 220 of the lower ball retainer 216. These ball supporting pins 218 are arranged to freely support the calibration ball 118. The ball supporting pins 218 are provided on an axially movably guided carrier 222, which is movable between a first upper position, in which the calibration ball 118 is supported on the ball supporting pins 218, and a second position, in which the ball supporting pins 218 are retracted and the calibration ball rests on the lower ball retainer 216. Furthermore means are provided for moving the carrier 222 between the first upper position and the second lower position. The means for moving the carrier 222 comprise a gear 224, which has a central aperture 228 with an internal thread, and which is arranged to be driven by a servomotor through a pinion (not shown). An adjusting thread 230 is formed on the peripheral surface of the carrier 222, with which the carrier 222 is guided in the inner thread 226 of the aperture 228.

Stops 232 are provided on the housing 104 and limit the downward movement of the measuring mass 86. A projection 234 with a conical outer surface 236 flared towards the lower end is provided at the lower end of the measuring mass 86. The conical outer surface 236 of the projection is surrounded with clearance by an annular spring 238. Cams 240 are provided on the carrier 222. When the carrier is moved further down beyond said second lower position, the cams 240 will engage the annular spring 238 and urge the annular spring against the conical outer surface 236 of the projection 234. Through this projection 234 the measuring mass is then pulled downwardly against the stops 232 on the housing 104. The annular spring 238 has radial slots 242, which extend through the slots 242 and hold the carrier 222 against rotation.

The arrangement described operates as follows:

The measuring mass 86 is held in a position of equilibrium by springs 88,90 . . . . The position of equilibrium is selected such that, with a predetermined value of the acceleration due to gravity, the operating point coincides with a value of minimum, substantially zero slope of the force-versus-deviation characteristic of the spring system. Thereby the weight of the measuring mass 86 is supported in such a manner that, at least with small deviations, practically no restoring force is exerted on the measuring mass 86 by the supporting springs.

Figure 7:
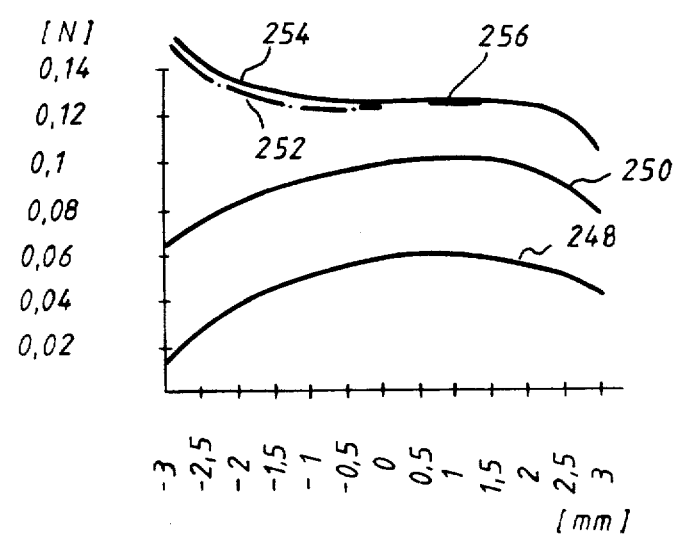
FIG. 7 shows the force-versus-deviation characteristics of the two spring systems acting upwards and downwards, respectively, as well as the resultant force-versus-deviation characteristic.

An example is illustrated in FIG. 7.

Numeral 248 designates the force-versus-deviation characteristic of the lower spring system, the force being directed downwardly in FIG. 5. Numeral 250 designates the force-versus-deviation characteristic of the upper spring system, the force being directed upwardly in FIG. 5. A resultant force-versus-deviation characteristic results from these two spring systems and is illustrated in FIG. 7 in dash-dotted line with expanded ordinate and is designated by numeral 252. The course of the resultant force-versus-deviation characteristic can be varied in any desired manner by appropriate dimensioning of the individual spring systems. In order to achieve a range as large as possible with substantially zero slope, it can be advantageous to slightly offset the maxima of the two force-versus-deviation characteristics 248 and 250 with respect to each other. The two force-versus-deviation characteristics can be selected also to leave a small remaining slope, such that the small slope of the characteristic of the measuring range spring 112 is compensated for. This is illustrated in FIG. 7. When the spring characteristic of the measuring range spring 112 is taken into consideration there, a force-versus-deviation characteristic 254 is obtained. This characteristic has an extensive, substantially horizontal range 256.

When the acceleration due to gravity deviates from the predetermined value representing the operating point, this will result in a relatively large deviation of the measuring mass 86. The deviation of the measuring mass is picked off by means of a sensor which comprises a differential capacitor 94. The pick-off signal from the sensor is applied through an appropriate servo amplifier to the restoring force generator 92 which compensates for the change of the weight of the measuring mass 86 caused by the change of the acceleration due to gravity. Therefore the measuring mass 86 is always restrained to its zero position.

The whole measuring range of the borehole gravimeter is to be ±5000 mgal. Variations of the acceleration due to gravity of 1μ gal are to be measured. This is a very large dynamic range, which cannot be covered by the sensor with the differential capacitor 94 and the restoring force generator 92 alone, in the manner described. Therefore the measuring range is adjustable by means of the measuring range spring. The measuring range spring is able to realize measuring ranges from about 300 to 600 mgal. As the measuring range spring needs not to balance the weight of the measuring mass 86 but only the variations of the weight caused by variations of the acceleration due to gravity, it can be very weak. By using large displacements for the adjustment of about 5 mm reproducibility of the measuring ranges of about 2 mgal or better can be achieved. The measuring ranges are set by tensioning the measuring range spring 112 more or less through the adjusting member 114. During measuring within one measuring range the prestress of the measuring range spring 112 has to be highly stable. This makes high requirements with respect thermal stability of the whole instrument. Furthermore the adjusting rod 114 has to be clamped and held in such a manner that any movements, even in the μm - range, are avoided. Therefore the measuring range adjustment is subdivided into an adjustment procedure and into a clamping and securing procedure.

In order to adjust the measuring range the gear 146 is rotated with the collet chuck 156 loosened. The adjusting rod 114 is axially adjusted through the adjusting thread 144 in the adjusting disc 142 rotated with the gear 146. Thereby the tension of the measuring range spring 112 is changed. The adjusting disc 142 rotates while the adjusting rod 114 is held against rotation in the guiding sleeve 138 by the pin 134 and the longitudinal slot 138. The displacement of the adjusting rod 114 is reproducibly determined from the pitch of the adjusting thread 144 on the adjusting rod 114 and the signal from a pick-off (not shown) at the gear 146.

After the adjusting procedure has been completed, the collet chuck 156 is closed. To this end the gear 166 is driven whereby the chuck 156 is urged downwards through the disc 164 provided with the adjusting thread. Thereby the inner sleeve 152 is clamped and firmly held on the adjusting rod 114 as described.

It is important that the coefficient of friction between the inner sleeve 152 and the collet chuck 156 is as small as possible, in order to keep the longitudinal force acting on the inner sleeve as small as possible. In this way minimum elastic expansion of the inner sleeve is achieved. By a pick-off (not shown) for picking off the position of the gear 162 the longitudinal force acting on the inner sleeve can be maintained always on the same level.

In the manner described, a measuring range is adjusted within which the occurring variations of the acceleration due to gravity can be balanced by the restoring force generator 92.

During normal measuring operation the additional mass in the form of the calibration ball 118 is supported on the three ball supporting pins 218, which are provided on a bridge 221 of the carrier 222. As the carrier (in turn) is supported on the housing, the measurement is not influenced by the calibration ball 118. By rotating the gear 224 by means of a servomotor through a pinion (not shown), the carrier 222 can be moved downwards. The pins are retracted from the lower ball retainer 216, whereby the calibration ball 118 rests at three points on the lower ball retainer 216. Now the calibration ball 118 loads the measuring mass 86. This permits calibration of the gravimeter.

In order to lock the gravimeter, the carrier 222 is moved further down through the gear 224. Then the cam 240 engages the annular spring 238 and urges this spring 238 against the conical surface 236 of the projection 234, which (extending around bridge 221) is connected with the measuring mass 86. Thereby the measuring mass is pulled downwards and engages the stop 232.

I claim:

1. Gravimeter, comprising
   (a) a measuring mass (86) held in a housing (104) for rectilinear, vertical movement,
   (b) prestressed spring means (88,90. . .) for weakly supporting said measuring mass (86) in a state of equilibrium, (c) a sensor (94) arranged to respond to deviations of said measuring mass (86) from said state of equilibrium.

(d) restoring force generator means (92) controlled by said sensor (94) and operatively connected to said measuring mass (86) for exerting a restoring force on said measuring mass (86) in accordance with a restoring force-versus-deviation characteristic, when said measuring mass (86) deviates from said state of equilibrium, characterized in that (e) said spring means comprise springs (80,90 . . . ) which (e$_1$) are arranged in regular array around said measuring mass (86), and (e$_2$) are arranged to exert pressing forces on said measuring mass (86) along respective lines of action (96,98) which are inclined with respect to the horizontal, (f) said state of equilibrium coincides with a value of minimum, substantially zero slope of said resultant restoring force-versus-deviation characteristic of said spring means.

2. Gravimeter as claimed in claim 1, characterized in that said spring means comprise (a) a first set of springs (88,88A,88B) arranged to exert an upward resultant force on said measuring mass (86) and (b) a second set of springs (90,90A,90B) arranged to exert a downward resultant force on said measuring mass (86), said resultant restoring force-versus-deviation characteristic resulting from the difference of these two resultant forces.

3. Gravimeter as claimed in claim 1, characterized in that said spring means comprises (a) tension springs (88,90 . . . ) arranged to exert tensile forces, and (b) lever transmission means (100,102 . . . ) operatively connected to said tension springs (88,90 . . . ) for converting said tensile forces into said pressing forces, and operatively connected to said measuring mass (86) to exert said pressing forces on said measuring mass (86).

4. Gravimeter as claimed in claim 3, characterized in that said lever transmission means (100) comprise (a) a pivotable lever (116) which is pivoted on said housing, said tension spring (88) being connected to said pivotable lever (116) to exert a tensile force thereon in the direction towards said measuring mass (86), and (b) a link (117), which is pivoted, on one hand, on said pivotable lever (116) and, on the other hand, on said measuring mass (86).

5. Gravimeter as claimed in claim 4, characterized in that said tension spring (88) extends substantially parallel to said link (117).

6. Gravimeter as claimed in claim 4, characterized in that said pivotable lever (116) is pivoted on said housing (104) by means of a flexural pivot (120).

7. Gravimeter as claimed in claim 4, characterized in that said link (117) is pivoted on said pivotable lever (116) by means of a first flexural pivot (122) and is pivoted on said measuring mass (86) by means of a second flexural pivot (124).

8. Gravimeter as claimed in claim 6, characterized in that said housing (104) comprises vertically adjustable spring bridge means (126), said tension spring (88) having an end remote from said pivotable lever (116), said remote end being affixed to said spring bridge means (126).

9. Gravimeter as claimed in claim 1, characterized in that (a) said measuring mass (86) is a generally hollow cylindrical body, which has an upper end and a lower end and is arranged central in said housing (104) and is supported with respect to said housing by said spring means, and which defines a central bore within said body, (b) said restoring force generator means (92) comprises coil means (106,108,110), which surround said measuring mass (86) coaxially, and (c) a measuring range spring (112) for varying the measuring range is arranged in said central bore, said measuring range spring (112) having a lower end, which is affixed to said lower end of said measuring mass (86), and an upper end, (d) an adjusting member (114) is mounted on said housing (104) for vertical adjustment relative thereto, said upper end of said measuring range spring (112) being secured to said adjusting member (114).

10. Gravimeter as claimed in claim 9, characterized (a) servomotor means (130) for adjusting said adjusting member (114) vertically, and (b) clamping means (132) for clamping and firmly holding said adjusting member (114), said clamping means being arranged to be actuated independently of said servomotor means (130).

11. Gravimeter as claimed in claim 10, characterized in that (a) said adjusting member (114) is an adjusting rod, a guiding sleeve (138) is attached to said housing (104), and said adjusting rod is guided in said guiding sleeve (138) non-rotatably but longitudinally movably, and (b) said servomotor means (130) comprise (b$_1$) an adjusting disc (142) having a central threaded bore defining an adjusting thread (144), said adjusting rod (114) having a corresponding thread and being guided with this thread in said threaded bore, and (b$_2$) a gear (146) connected with said adjusting disc (142) and (b$_3$) a servomotor and a pinion (148) in driving connection with said servomotor, said pinion (148) being arranged to drive said gear (146).

12. Gravimeter as claimed in claim 11, characterized in that said clamping means (132) comprise (a) a slotted inner sleeve (152) which is arranged housing-fixed within an upper portion (154) of said guiding sleeve (138) and closely surrounds said adjusting rod (114), (b) a slotted collet chuck (156) which (b$_1$) is arranged between said guiding sleeve (138) and said inner sleeve (152), and (b$_2$) is longitudinally movable, and (b$_3$) has a conical surface at its lower end tapering towards said lower end, (c) a conical inner surface (160), complementary to said conical surface on said collet chuck, on said guiding sleeve (136), and (d) means for axially displacing said collet chuck (156), said collet chuck, when moved downwards, being compressed radially through the conical inner surface (160) of the guiding sleeve (136) and the tapering conical surface (158) of the collet chuck (156) and, in turn radially compressing said inner sleeve (152) to clamp and firmly hold said adjusting rod (114).

13. Gravimeter as claimed in claim 12, characterized in that said means for adjusting said collet chuck (156) comprise
   (a) a disc (164) attached to an upper end of said collet chuck (156), said disc having an adjustment thread (162) on its periphery,
   (b) a gear (166) which has a central, internally threaded aperture into which said disc (164) is screwed with its adjustment thread (162), and
   (c) a servomotor (170) with a pinion (174), said servomotor (170) being arranged to drive said gear (166) through said pinion (174), and
   (d) means (182,184) for holding said collet chuck (156) against rotation.

14. Gravimeter as claimed in claim 13, characterized in that said means for adjusting said collet chuck (156) further comprise
   (a) a first four-point ball bearing (186),
   (b) a housing-fixed flange (178) on said guiding sleeve (138), said gear (166) of said clamping means (132) being mounted on said flange (178) through said first four-point ball bearing (186),
   (c) a second four-point ball bearing (188), said gear (146) of said servomotor means (130) being mounted on said gear (166) of said clamping means (132) through said second four-point ball bearing and
   (d) a bearing preloading disc (190) attached to the upper end of said inner sleeve (152),
   (e) a third four-point ball bearing (192), said bearing preloading disc (190) being arranged to resiliently press on said gear (146) of said servomotor means (130), whereby all said four-point ball bearings (186,188,192) are preloaded.

15. Gravimeter as claimed in claim 14, characterized in that
   (a) a reversedly pot-shaped spring holding member (194) has a central pin (196) on the top surface of its bottom and has a central bore (198) passing through said bottom and pin (196),
   (b) said upper end of said measuring range spring (112) extends into said bore and is secured therein,
   (c) said spring holding member (194) is held in a slotted collet chuck (200) attached to the lower end of said adjusting rod (114), said collet chuck having an upper end face, an external thread (206) and a conical surface (202) flared towards the lower end,
   (d) a clamping sleeve (204) with a correspondingly flared conical inner surface has its lower end guided on said collet chuck (200), and
   (e) a nut (208) is screwed on said external thread (206) and presses against the upper end face of said collet chuck (200).

16. Gravimeter as claimed in claim 1, characterized by means (115) permitting an additional mass (118) to be placed on said measuring mass (86) for calibration purposes.

17. Gravimeter as claimed in claim 16, characterized in that said means (115) permitting an additional mass (118) to be placed on said measuring mass (86) comprise
   (a) upper and lower ball retainer means (214,216) attached to said measuring mass (86), said lower ball retainer means (216) having apertures (220) therein,
   (b) a calibration ball representing said additional mass (118) and axially movable between said upper and lower ball retainer means (214,216),
   (c) ball supporting pins (218), which extend through said apertures (220) of said lower ball retainer means (216) and are arranged to freely support said calibration ball,
   (d) a carrier (228) and means for guiding said carrier axially movably but non-rotatably, said ball supporting pins (218) being attached to said carrier (228), which is movable between a first, upper position, in which the calibration ball (118) is supported on said ball supporting pins (218), and a second, lower position, in which the ball supporting pins are retracted and the calibration ball (118) rests on said lower ball retaining means (116), and
   (e) means for moving said carrier (222) between said first, upper and said second, lower positions.

18. Gravimeter as claimed in claim 17, characterized in that said means for moving said carrier (222) comprise
   (a) a gear (224), which has an internally threaded central aperture (228),
   (b) a servomotor with a pinion which is in driving connection with said gear (224),
   (c) an adjusting thread (230) on the peripheral surface of said carrier (222), which is guided with its adjusting thread (230) in said internally threaded aperture.

19. Gravimeter as claimed in claim 18, characterized in that
   (a) stops (232) are provided on said housing (104) and limit downward movement of said measuring mass (86),
   (b) a projection (234) is provided at the lower end of the measuring mass (86), said projection (234) having a conical outer surface (236) flared towards the lower end,
   (c) said conical outer surface (236) of said projection (234) is surrounded with clearance by an annular spring (238),
   (d) cam means (240) are provided on said carrier (222) for engaging said annular spring (238), when said carrier (222) is moved further downwards beyond said second, lower position, and for urging said annular spring (238) against said conical outer surface (236) of said projection (234) to therethrough pull the measuring mass (86) downwards against said stops (232) on said housing (104).

20. Gravimeter as claimed in claim 19, characterized in that
   (a) said annular spring (238) has radial slots (242), and
   (b) axial pins (244) are provided on said carrier (222) and extend through said slots (242) to hold said carrier (222) against rotation.

* * * * *

UNITED STATES PATENT AND TRADEMARK OFFICE
CERTIFICATE OF CORRECTION

PATENT NO. : 4,497,206
DATED : February 5, 1985
INVENTOR(S) : Hans Scheurenbrand It is certified that error appears in the above-identified patent and that said Letters Patent are hereby corrected as shown below:

On the title page;

As the name of the Assignee, delete "Bodenseewerk Geratetchnik GmbH" and substitute therefor --Bodenseewerk Geosystem GmbH--.

Signed and Sealed this

Twenty-seventh Day of August 1985

[SEAL]

Attest:

DONALD J. QUIGG

Attesting Officer   Acting Commissioner of Patents and Trademarks